(12) United States Patent
Woo et al.

(10) Patent No.: US 11,932,274 B2
(45) Date of Patent: Mar. 19, 2024

(54) ELECTRONIC DEVICE AND CONTROL METHOD THEREFOR

(71) Applicant: SAMSUNG ELECTRONICS CO., LTD., Suwon-si (KR)

(72) Inventors: Sangjung Woo, Suwon-si (KR); Youmin Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 453 days.

(21) Appl. No.: 17/286,325

(22) PCT Filed: Dec. 24, 2019

(86) PCT No.: PCT/KR2019/018386
§ 371 (c)(1),
(2) Date: Apr. 16, 2021

(87) PCT Pub. No.: WO2020/138908
PCT Pub. Date: Jul. 2, 2020

(65) Prior Publication Data
US 2021/0380127 A1    Dec. 9, 2021

(30) Foreign Application Priority Data
Dec. 27, 2018  (KR) .......................... 10-2018-0170235

(51) Int. Cl.
*B60W 60/00*     (2020.01)
*B60W 50/00*     (2006.01)
(Continued)

(52) U.S. Cl.
CPC ...... *B60W 60/001* (2020.02); *B60W 50/0097* (2013.01); *B60W 50/0205* (2013.01);
(Continued)

(58) Field of Classification Search
CPC .......... B60W 60/001; B60W 50/0097; B60W 50/0205; B60W 2420/40; B60W 2420/42;
(Continued)

(56) References Cited

U.S. PATENT DOCUMENTS 9,776,644 B2    10/2017  Chun et al.
11,386,498 B1*  7/2022  Leise .................... G06Q 40/08
(Continued)

FOREIGN PATENT DOCUMENTS

JP      4042579 B2      2/2008
JP      2013-166540 A   8/2013
(Continued)

OTHER PUBLICATIONS

Communication dated Nov. 21, 2022 by the Korean Intellectual Property Office in Korean Patent Application No. 10-2018-0170235.
(Continued)

*Primary Examiner* — Robert T Nguyen
(74) *Attorney, Agent, or Firm* — Sughrue Mion, PLLC

(57) ABSTRACT

An electronic device is disclosed. The electronic device comprises: a communication interface; a memory in which a learning network model for predicting next data by learning temporally continuous data is stored; and a processor for acquiring prediction data that is to replace data received from the learning network model, when the occurrence of an error in data received from a sensor device through the communication interface is identified, performing an autonomous driving function on the basis of the acquired prediction data, counting the number of error occurrences, and providing information informing that a sensing state of the sensor device is abnormal, when the counting frequency is greater than or equal to a threshold value.

15 Claims, 13 Drawing Sheets

(51) Int. Cl.
*B60W 50/02* (2012.01)
*G06N 20/00* (2019.01)

(52) U.S. Cl.
CPC ......... *G06N 20/00* (2019.01); *B60W 2420/40* (2013.01); *B60W 2420/42* (2013.01); *B60W 2420/52* (2013.01)

(58) Field of Classification Search
CPC ......... B60W 2420/52; B60W 60/0015; B60W 2050/0215; B60W 50/02; B60W 30/14; B60W 40/02; B60W 2050/0059; B60W 2556/45; G06N 20/00; G06N 3/045; G06N 3/08
See application file for complete search history.

(56) References Cited

U.S. PATENT DOCUMENTS

| | | | |
|---|---|---|---|
| 11,747,360 B2* | 9/2023 | Carvalho ................. | G01P 5/14 702/50 |
| 2004/0230368 A1 | 11/2004 | Kropinski et al. | |
| 2011/0139509 A1* | 6/2011 | Pool ....................... | E21B 21/08 703/7 |
| 2016/0009295 A1 | 1/2016 | Chun et al. | |
| 2017/0286826 A1 | 10/2017 | Min et al. | |
| 2017/0364070 A1 | 12/2017 | Oba | |
| 2018/0173232 A1 | 6/2018 | Schwindt et al. | |
| 2018/0189647 A1 | 7/2018 | Calvo et al. | |
| 2018/0275044 A1* | 9/2018 | Surana ................. | G01H 1/003 |
| 2019/0230106 A1* | 7/2019 | Abbaszadeh ....... | H04L 63/1441 |
| 2023/0153680 A1* | 5/2023 | Rohrkemper ....... | G06F 11/3075 706/12 |

FOREIGN PATENT DOCUMENTS

| | | |
|---|---|---|
| KR | 10-1406208 B1 | 6/2014 |
| KR | 10-2015-0080336 A | 7/2015 |
| KR | 10-1555444 B1 | 10/2015 |
| KR | 10-1628547 B1 | 6/2016 |
| KR | 10-1729482 B1 | 4/2017 |
| KR | 10-2018-0007412 A | 1/2018 |
| KR | 10-1819967 B1 | 1/2018 |
| KR | 10-2018-0058090 A | 5/2018 |
| KR | 1020180069282 A | 6/2018 |
| KR | 10-1889049 B1 | 8/2018 |

OTHER PUBLICATIONS

Communication dated Feb. 6, 2023 by the Korean Intellectual Property Office in Korean Patent Application No. 10-2018-0170235.

Communication dated May 8, 2023 by the Korean Intellectual Property Office in Korean Patent Application No. 10-2018-0170235.

Xiaodan Liang et al., "Dual Motion GAN for Future-Flow Embedded Video Prediction", arXiv:1708.00284v2 [cs.CV], ICCV, Aug. 3, 2017, 9 pages total.

"Adaptive Cruise Control Is Unreliable, Vulnerable to Slope Ways and Bent Roads", danawa Research, Aug. 10, 2018, 4 pages total, http://dpg.danawa.com/news/view?boardSeq=60&listSeq=3699402.

International Search Report dated Apr. 14, 2020 issued by the International Searching Authority in International Application No. PCT/KR2019/018386 (PCT/ISA/210).

Written Opinion dated Apr. 14, 2020 issued by the International Searching Authority in International Application No. PCT/KR2019/018386 (PCT/ISA/237).

* cited by examiner

[CAMERA CAPTURED IMAGE]

[WHEN THERE IS ERROR OCCURRENCE IN CAPTURED IMAGE]

ELECTRONIC DEVICE AND CONTROL METHOD THEREFOR

TECHNICAL FIELD

The disclosure relates to an electronic device performing an autonomous driving function by predicting sensing data and a control method therefor.

BACKGROUND ART

An autonomous driving vehicle may perform an autonomous driving function through various sensors provided in the vehicle. However, when the sensors are not able to operate normally due to external environment and the like such as rain water splashing a camera sensor, there have been safety issues such as the autonomous driving function being terminated or the vehicle performing a emergency braking despite there being no obstacles at the front of the vehicle.

Accordingly, there is a growing need for driving safety such as maintaining the autonomous driving function even when there is a problem with some sensors, and the like.

DISCLOSURE

Technical Problem

Aspects of the disclosure are to address at least the above-mentioned problems and/or disadvantages and to provide at least the advantages described below. Accordingly, an aspect of the disclosure is to provide an electronic device which performs an autonomous driving function by predicting sensing data of a next situation using previously obtained sensing data even when sensors are not able to operate normally and a control method therefor.

Technical Solution

According to an embodiment, an electronic device includes a communication interface including circuitry, a memory stored with a learning network model configured to learn temporally continuous data and predict the next data, and a processor configured to obtain, based on identifying an error occurrence in data received from an external sensor device through the communication interface, prediction data to substitute the data received from the learning network model and perform an autonomous driving function based on the obtained prediction data, and count the number of error occurrences, and provide information notifying of an abnormal sensing state of the sensor device based on the number of counts being greater than or equal to a threshold value.

The processor may be configured to compare data received from the sensor device and data received from other sensor device and identify whether there is an error occurrence in the received data.

The processor may be configured to perform the autonomous driving function based on data received from the sensor device and data received from at least one other sensor device, and based on identifying that there is an error occurrence in the data received from the sensor device, add a relatively low weight to the data received from the sensor device than the data received from the other sensor device and perform the autonomous driving function.

The memory may be configured to store reference data corresponding to the respective sensor devices.

The processor may be configured to identify, based on there being a difference greater than or equal to a threshold value by comparing the data received from the sensor device and the reference data corresponding to the sensor device, that an error has occurred in the received data.

The sensor device may include at least one from among a camera device, a Lidar device, a Radar device, or an IR device.

The learning network model may be a Generative Adversarial Network (GAN) model.

The processor may be configured to count the number of error occurrences within a threshold time, and initialize the number of counts based on the number of counts within the threshold time being less than a threshold value.

The learning network model may be configured to learn temporally continuous data obtained from the sensor device and predict next data corresponding to the sensor device.

The learning network model may be configured to learn temporally continuous data obtained from the sensor device and data obtained from other sensor device, and predict next data corresponding to the sensor device.

The learning network model may be configured to remove noise included in data with an error occurrence, and learn data with the noise removed and temporally continuous data obtained from the sensor device and predict next data corresponding to the sensor device.

According to an embodiment, a control method therefor of an electronic device in which a learning network model configured to learn temporally continuous data and predict next data is stored, the method includes, identifying whether there is an error occurrence in data received from an external sensor device, based on identifying an error occurrence in data received from the external sensor device, obtaining prediction data to substitute the received data from the learning network model and performing an autonomous driving function based on the obtained prediction data, and counting the number of error occurrences, and providing information notifying of an abnormal sensing state of the sensor device based on the number of counts being greater than or equal to a threshold value.

The identifying whether there is an error occurrence may include identifying whether there is an error occurrence in the received data by comparing data received from the sensor device and data received from other sensor device.

The performing the autonomous driving function may include performing the autonomous driving function based on data received from the sensor device and data received from at least one other sensor device, and based on identifying an error occurrence in the data received from the sensor device, adding a relatively low weight to the data received from the sensor device than the data received from the other sensor device and performing the autonomous driving function.

The identifying whether there is an error occurrence may include comparing the data received from the sensor device and the stored reference data corresponding to the sensor device, and based on there being a difference greater than or equal to a threshold value, identifying as there being an error occurrence in the received data.

The sensor device may include at least one from among a camera device, a Lidar device, a Radar device, or an IR device.

The learning network model may be a Generative Adversarial Network (GAN) model.

Based on the number of error occurrences being counted within a threshold time and the number of counts being less than a threshold value within the threshold time, initializing the number of counts may be further included.

The learning network model may be configured to learn temporally continuous data obtained from the sensor device and predict next data corresponding to the sensor device.

The learning network model may be configured to learn temporally continuous data obtained from the sensor device and data obtained from the other sensor device, and predict the next data corresponding to the sensor device.

The learning network model may be configured to remove noise included in the data in which the error occurred, and learn the data with the noise removed and the temporally continuous data obtained from the sensor device and predict the next data corresponding to the sensor device.

Effect of Invention

According to one or more embodiments of the disclosure as described above, previous sensing data may be used to predict sensing data of a next situation.

In addition, the autonomous driving function may be performed even when sensors are not able to operate normally, and time for providing notification recommending to the user to personally drive may be obtained.

BEST MODE OF EXEMPLARY EMBODIMENTS

Detailed Description of Exemplary Embodiments

Figure 1:
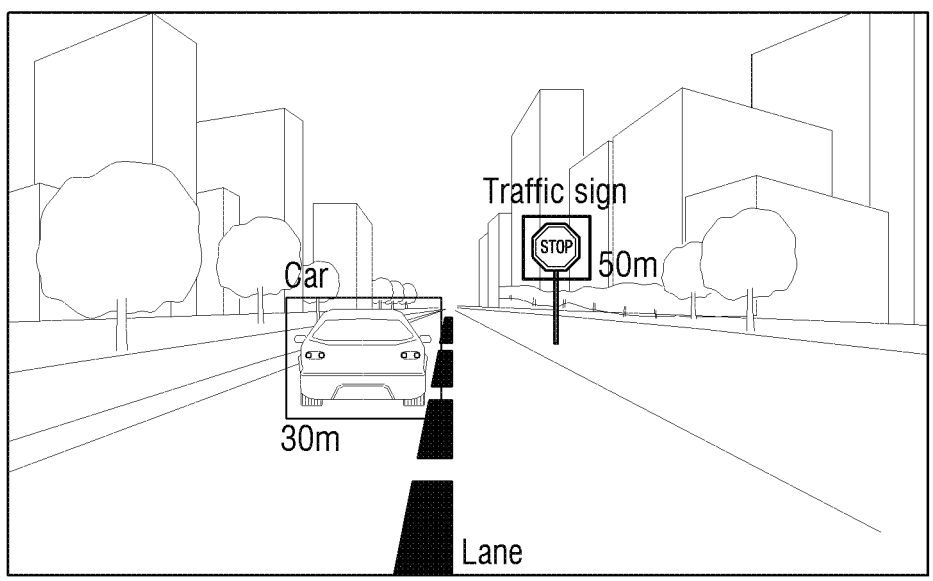
FIG. 1 is a diagram illustrating an electronic device obtaining a live map through a surrounding image which includes various objects to assist in the understanding of the disclosure.

The disclosure will be described in detail below with reference to the accompanying drawings.

Terms used herein will be briefly described and the disclosure will be described in detail.

The terms used in the embodiments of the disclosure are general terms that are currently widely used and identified in consideration of the functions in the disclosure. However, these terms may vary depending on intention, legal or technical interpretation, emergence of new technologies, and the like of those skilled in the related art. Also, there may be some terms arbitrarily identified by an applicant, and in this case the meaning thereof will be described in detail in the description part of the corresponding disclosure. Accordingly, the terms used herein may be understood, not simply by their designations, but based on the meaning of the term and the overall content of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the one or more embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing embodiments, detailed description of related known technologies may unnecessarily confuse the gist of the disclosure, the detailed description will be omitted.

A singular expression includes a plural expression, unless otherwise specified. It is to be understood that the terms such as "comprise" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The expression at least one of A and/or B is to be understood as indicating at least one of "A" or "B" or "A and B."

Expressions such as "first," "second," "1st," "2nd," or so on used in the disclosure may be used to refer to various elements regardless of order and/or importance, and may be used only to distinguish one element from another, but not limit the corresponding elements.

When a certain element (e.g., first element) is indicated as being "(operatively or communicatively) coupled with/to" or "connected to" another element (e.g., second element), it may be understood as the certain element being directly coupled with/to the other element or as being coupled through another element (e.g., third element).

The terms "module" or "part" used in the embodiments herein perform at least one function or operation, and may be implemented as a hardware or software, or a combination of hardware and software. Further, a plurality of "modules" or a plurality of "parts", except for a "module" or a "part" which needs to be implemented to a specific hardware, may be integrated to at least one module and implemented in at least one processor (not shown). In the disclosure, the term "user" may refer to a person using an electronic device or a device (e.g., artificial intelligence electronic device) using an electronic device.

Embodiments of the disclosure will be described in detail below with reference to the accompanying drawings to aid in the understanding of those of ordinary skill in the art. However, the disclosure may be realized in various different forms and it should be noted that the disclosure is not limited to the one or more embodiments described herein. Further, in the drawings, parts not relevant to the description may be omitted, and like reference numerals may be used to indicate like elements throughout the disclosure.

Embodiments of the disclosure will be described in greater detail below with reference to the accompanied drawings.

FIG. 1 is a diagram illustrating an electronic device obtaining a live map through a surrounding image which includes various objects to assist in the understanding of the disclosure.

Referring to FIG. 1, the electronic device 100 according to an embodiment of the disclosure may be a driving assistance device which is mounted to a vehicle, and may be a device configured to perform an autonomous driving of the vehicle. Specifically, the electronic device 100 may be a device which implements Advanced Driver Assistance Systems (ADAS) and may be implemented as an electric system of a vehicle, a room mirror integrated module, a black box detachable from the vehicle, and in the form of a mobile device such as a mobile phone or a personal digital assistant (PDA). Meanwhile, the electronic device 100 may include a learning network model based on machine learning. The learning network model will be described in detail below.

The electronic device 100 may obtain a live map based on data received from a sensor device 200, and perform autonomous driving of a vehicle based on the live map. Here, the live map may refer to a map of the vehicle surroundings which is updated in real-time. The live map may include a type of an object, a distance with the object, a lane, a traffic sign, and the like, but is not limited thereto.

The sensor device 200 may be a device for sensing information on the surrounding environment, road conditions, and the like. The sensor device 200 may include a camera device, a Lidar device, a Radar device, an IR device, or the like. Meanwhile, the sensor device 200 may be configured to simply transmit the data obtained in the sensor device 200 to the electronic device 100, but may transmit processed data to the electronic device 100 by processing the obtained data directly. Meanwhile, the sensor device 200 may be implemented as a device separate from the electronic device 100, or implemented included inside the electronic device 100. For convenience of description, the sensor device 200 being implemented as a device separate from the electronic device 100 will be described below.

Meanwhile, an error may occur in the data processed in the sensor device 200 because of the external environment. For example, an error may occur in the data obtained from the camera device and the Radar device due to a water splashing phenomenon of the next lane in a road pouring with heavy rain. In this case, a problem may occur to the autonomous driving function of the electronic device 100.

Accordingly, one or more embodiments of the electronic device 100 being able to perform the autonomous driving function normally even when the electronic device 100 has not received data normally from the sensor device 200 will be described in detail below.

Figure 2:
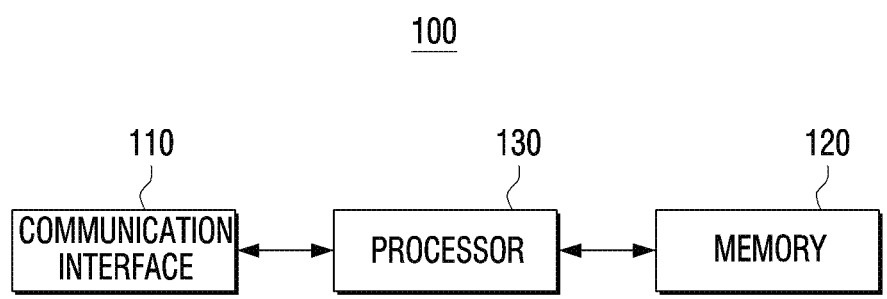
FIG. 2 is a block diagram illustrating an operation of an electronic device according to an embodiment of the disclosure.

FIG. 2 is a block diagram illustrating an operation of the electronic device according to an embodiment of the disclosure.

Referring to FIG. 2, the electronic device 100 may include a communication interface 110, memory 120, and a processor 130.

The communication interface 110 may be a configuration capable of transmitting to and receiving data from an external sensor device 200.

In an example, the communication interface 110 may be a configuration capable of transmitting data to the external sensor device 200 according to a wired/wireless communication method. In an example, the communication interface 110 may be configured to use communication methods such as, for example, and without limitation, Bluetooth (BT), Wireless Fidelity (WI-FI), ZigBee, Infrared (IR), Ethernet, Serial Interface, Universal Serial Bus (USB), Mobile Industry Processor Interface Camera Serial Interface (MIPI CSI), Near Field Communication (NFC), Vehicle to Everything (V2X), Cellular, and the like.

Specifically, the communication interface 110 may be configured to receive at least one of a raw data or a processed data from the external sensor device 200, which will be described in detail below.

The memory 120 may be configured to store the learning network model which predicts the next data by learning the temporally continuous data. Specifically, the memory 120 may be configured to store most recent data of a pre-set number transmitted from the sensor device 200, and store the learning network model which learned the data.

In addition, the memory 120 may be configured to store reference data corresponding to the respective sensor devices.

Here, the reference data may be data used to identify whether there is an error occurrence of the received data, and may be data of a normal state with no error occurrence for the respective sensor devices. For example, the reference data of the camera device may be data related to a range of pixel values.

In addition, the memory 120 may be configured to store a program for performing the autonomous driving function. In addition, the memory 120 may be configured to store a program for performing other functions of the electronic device 100.

The program for performing the autonomous driving function may include at least one from among object tracking, planning, visualization function, control, lane detection, live mapping, object detection, or scene segmentation. The program for performing the autonomous driving function may include at least one from among object tracking, planning, visualization function, control, lane detection, live mapping, object detection, or scene segmentation.

The memory 120 may be implemented as a memory separate from the processor 130. In this case, the memory 120 may be implemented in the form of a memory embedded in the electronic device 100 according to a data storage use, or in the form of a memory detachable from the electronic device 100. For example, the data for the driving of the electronic device 100 may be stored in a memory embedded to the electronic device 100, and data for an expansion function of the electronic device 100 may be stored in a memory detachable from the electronic device 100. The memory embedded in the electronic device 100 may be implemented as at least one of a volatile memory (e.g., a dynamic RAM (DRAM), a static RAM (SRAM), or a synchronous dynamic RAM (SDRAM)), or a non-volatile memory (e.g., one time programmable ROM (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive (HDD) or a solid state drive (SSD)). The memory detachable from the electronic device 100 may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a USB port, or the like.

In addition, the memory 120 may be implemented as an internal memory such as, for example, and without limitation, a read only memory (ROM; e.g., electrically erasable programmable read-only memory (EEPROM)), a random access memory (RAM), or the like included in the processor 130.

Meanwhile, in the above-described embodiment, a program for performing the autonomous driving function being stored in the memory 120 provided in the electronic device 100 has been described, but according to another embodiment, it may be stored in an external server, and in this case, it may be possible for the electronic device 100 to receive and use the corresponding program.

The processor 130 may be configured to control the overall operation of the electronic device 100.

According to an embodiment of the disclosure, the processor 130 may be implemented as a digital signal processor (DSP), a microprocessor, and a time controller (TCON) that processes digital signals. However, the embodiment is not limited thereto, and may include, for example, and without limitation, one or more from among a central processing unit (CPU), a micro controller unit (MCU), a micro processing unit (MPU), a controller, an application processor (AP), a communication processor (CP), an ARM processor, or the like, or may be defined by the corresponding term. In addition, the processor 130 may be implemented as a System on Chip (SoC) or a large scale integration (LSI) embedded with a processing algorithm, and may be implemented in the form of a field programmable gate array (FPGA). The processor 130 may be configured to perform various functions by executing computer executable instructions stored in the memory 120.

The processor 130 comprising circuitry may be configured to identify whether there is error occurrence of data received from the sensor device 200 through the communication interface 110.

According to an embodiment, the processor 130 may be configured to identify whether there is an error occurrence in the received data by comparing the data received from the sensor device 200 and the data received from another sensor device.

The sensor device 200 may include at least one from among the camera device, the Lidar device, the Radar device, or the IR device. For example, in a raining situation, the Lidar device may recognize rain drops as objects and generate a 3D image. That is, the rain drops may be displayed as dots in the 3D image generated by the Lidar device. However, in the image captured by the camera device, the rain drop image may not be captured. In this case, the processor 130 may be configured to identify that there is a difference in data by comparing the 3D image obtained by the Lidar device and the captured image obtained by the camera device, and identify there is an error occurrence in the data received from the sensor device 200.

According to another embodiment, the processor 130 may be configured to identify whether there is an error occurrence in data based on the data obtained from the one sensor device 200. Specifically, the processor 130 may be configured to identify, based on there being a difference of a threshold value or more by comparing the data received from the sensor device 200 and the reference data corresponding to the sensor device 200, that there is an error occurrence in the received data. Here, the reference data may be data of a normal state with no error occurrence for the respective sensor devices. The reference data may vary for the respective sensor devices, and may be data stored in the memory 120. For example, the reference data of the camera device may be data related to the range of pixel values. In an example, when a blackening phenomenon occurs to an image captured from the camera device, the processor 130 may be configured to identify data to which blackening phenomenon has occurred as an error occurrence by determining the pixel value of the corresponding image as not belonging in the pixel value range included in the reference data. Here, the blackening phenomenon may be a phenomenon in which a part of the captured image is displayed as black due to a sudden change in illuminance of the surrounding environment.

Alternatively, the reference data may be data on the threshold value of the degree of sudden change. For example, a blackening phenomenon may occur to an image obtained by the camera device at the point in time the vehicle enters a tunnel, and when the pixel value of the captured image is suddenly close to 0 by the blackening phenomenon, the processor 130 may be configured to identify that there is an error occurrence in the image obtained by the camera device. Here, the degree of sudden change may be calculated with the change in pixel value with respect to time. That is, the data error may include an overshooting phenomenon occurring in the data. Here, the overshooting phenomenon may refer to a phenomenon of a sudden change in data, and may be, for example, a pixel value suddenly changing.

However, as described above, the error in received data may not only include the case of having received data but receiving the data with the error included but also the case of the electronic device 100 having failed in receiving data.

The processor 130 may be configured to obtain, based on identifying an error occurrence in the data received from the sensor device 200, prediction data to substitute the data received from the learning network model. Here, the learning network model may be a model that predicts the next data by learning the temporally continuous data. For example, based on learning the image captured consecutively for 10 seconds from the camera device, the learning network model may be configured to predict the next image of a section after the 10 seconds. Meanwhile, the learning network model may be configured to predict the next data periodically regardless of whether there is an error occurrence in receiving data, or predict the next data by learning the existing data only when there is an error occurrence.

The learning network model may be a Generative Adversarial Network (GAN) model. However, the embodiment is not limited thereto, and various models may be used so long as the learning network model is a model that can predict the next data based on the learned data.

The processor 130 may be configured to perform the autonomous driving function based on the prediction data obtained from the learning network model. For example, based on learning the image captured consecutively for 10 seconds from the camera device, if there is an error occurrence in the captured image due to the external environment thereafter, the learning network model may be configured to predict the next image based on the image captured consecutively for 10 seconds. In an example, it may be assumed that there is an obstacle present at 100 meters in front of the vehicle in the last frame of the image captured consecutively for 10 seconds. Then, based on an error occurring in the captured image due to the external environment, the learning network model may be configured to predict the next images in which the vehicle becomes closer in distance with the obstacle based on a steering of a vehicle steering wheel and speed information of the vehicle included in the existing image captured consecutively for 10 seconds. Based on identifying that the distance between the vehicle and the obstacle is within a threshold distance from the learning network model based on the predicted next images, the processor 130 may be configured to perform braking of the vehicle based on the autonomous driving function.

Meanwhile, the processor 130 may be configured to perform the autonomous driving function based on data received from the sensor device 200 and data received from at least one other sensor device. For example, at least one from among object tracking, lane detection, object detection, or scene segmentation function may be performed based on the data received from the plurality of sensor devices such as, not only the camera device, but also the Lidar device, the Radar device, and the IR device, and the location of the object, the type of the object, the distance with the object, road conditions, lanes, and the like may be detected. Then, the processor 130 may be configured to generate the live map by performing the live mapping function based on the detected data, and according the autonomous driving function may be performed. Here, the object tracking may be a function of tracking an object which is the same as the object of the previous frame by comparing the location of the object in the plurality of frames, the lane detection may be a function of identifying the lane, the type of the lane, the direction of the lane, and the like, the object detection may be a function of detecting an object and identifying the type of the object, or the like, and the scene segmentation may be a function of segmenting a scene, and a function of mapping the identified type of object, the distance with the object, surrounding road conditions, or the like on the map in real-time.

However, based on identifying an error occurrence in the data received from a specific sensor device 200, the processor 130 may be configured to perform the autonomous driving function by adding a relatively low weight to the data received from the sensor device 200 than the data received from the other sensor device. For example, based on the blackening phenomenon being included in the captured image obtained from the camera device, the processor 130 may be configured to identify that there is an error occurrence in the data received from the camera device. Then, the processor 130 may be configured to add a weight of 0.5 to the data received from the camera device, and add a weight of 1 to the other device in which there is no error occurrence. Accordingly, the data received from the camera device may be used in performing the autonomous driving function with a relatively low weight. The above-described numerical value is merely one example.

Meanwhile, the processor 130 may be configured to add a relatively low weight to the data of the sensor device in which an error occurred for only during a pre-set time. For example, the reason the blackening phenomenon occurs in the image obtained from the camera device may be because the vehicle entered a tunnel. Accordingly, because the blackening phenomenon may not occur if the vehicle does not enter the tunnel, the processor 130 may be configured to process the weight of the data received from the camera device as low for only during the pre-set time, and when the pre-set time has passed, add a weight of a same level as the remaining sensor devices.

Meanwhile, the processor 130 may be configured to add weight to the data received from the respective sensor devices based on the external environment. For example, when the vehicle enters a tunnel or exists from the tunnel, because a sudden change in pixel value occurs to the image captured from the camera device, the processor 130 may be configured to add a relatively low weight to the data received from the camera device in a section in which the vehicle enters the tunnel or the vehicle exists from the tunnel. Alternatively, in case of rain, rain drops may be displayed in the 3D image generated from the Lidar device, and this may be unnecessary noise. Accordingly, the processor 130 may be configured to add a low weight to the data received from the Lidar device when there is rain.

Meanwhile, the processor 130 may be configured to count the number of error occurrences. For example, the processor 130 may be configured to count a number of frames of a situation identified as an error having occurred. In an example, assuming that the frame per second is 30 FPS and that an error has occurred for 3 seconds, the processor 130 may be configured to count the number of error occurrences as 90.

Alternatively, the processor 130 may be configured to count the case in which the number of frames in which error has occurred are greater than or equal to a pre-set value as an error occurrence. For example, based on a pre-set value being 10, if an error occurs consecutively in 10 frames, the processor 130 may be configured to count the number of error occurrences as 1 time. In addition, if an error occurs consecutively in 30 frames, the processor 130 may be configured to count the number of error occurrences as 3 times.

Alternatively, if an error occurs, the learning network model may be configured to predict the next data, and the processor 130 may count the number of error predictions by the learning network model as the number of error occurrences.

According to an embodiment, the processor 130 may be configured to provide information notifying that the sensing state of the sensor device 200 is abnormal based on the number of counts being greater than or equal to the threshold value.

Here, the abnormal sensing state may include a case of a sensing operation of the sensor device 200 being performed normally, but the sensing accuracy of the surrounding environment being relatively low due to external factors (e.g., there being relatively much noise in the image obtained from the Lidar device due to heavy rain), and a case of sensing accuracy of the surrounding environment being relatively low due to a malfunction of the sensor device 200 or sensing not being performed. In addition, assuming that the sensor device 200 obtains raw data and even performs preprocessing (e.g., object detection) and transmits to the electronic device 100, a case of the sensor device 200 obtaining raw data normally, but not being able to perform preprocessing normally may also be included in the abnormal sensing state. For example, a case of the camera device obtaining a surrounding image (raw data) normally, but not being able to perform object detection from the obtained data may be included in the abnormal sensing state.

According to another embodiment, the processor 130 may be configured to count the time in which the number of error occurrences are maintained. Specifically, based on the time in which the error occurrence is maintained being greater than or equal to the threshold value, the processor 130 may be configured to provide information notifying an abnormal sensing state. For example, based on the error occurrence being maintained for 3 seconds, the processor 130 may be configured to provide information recommending to the user to personally drive.

The processor 130 may be configured to provide information notifying of an abnormal sensing state of the sensing device 200 in various forms. For example, the processor 130 may be configured to output a specific sound or voice through the speaker (not shown). In an example, the processor 130 may be configured to output a warning sound through the speaker or provide a voice to the user suggesting to personally drive. Alternatively, the processor 130 may be configured to provide information notifying of an abnormal sensing state through the display (not shown). For example, the processor 130 may be configured to provide information notifying of an abnormal sensing state through a navigation screen or a cluster screen. Alternatively, the processor 130 may be configured to provide notification in the form of vibrating a steering wheel or emitting a light source.

Accordingly, the user may become aware that a problem may occur in performing the autonomous driving function and perform personal driving. However even if the sensing state of the sensor device 200 is identified as abnormal, because the autonomous driving function is not immediately terminated, time is provided so that the user may perform personal driving and driving safety may be increased.

Meanwhile, the processor 130 may be configured to count the number of error occurrences within the threshold time, and the number of counts may be initialized based on the number of counts being less than the threshold value within the threshold time. For example, the threshold time may be 3 seconds and the threshold value may be 10 times. If the number of error occurrences within the threshold time of 3 seconds is counted as 5 times, the processor 130 may be configured to initialize the counting of 5 times and then newly count the number of error occurrences for 3 seconds. The electronic device 100 according to an embodiment of the disclosure is to solve the error which occurred for a temporary time, and it is preferable to newly count the number of error occurrences after the threshold time has passed. Alternatively, the processor 130 may be configured to initialize counting based on normal data being input.

Meanwhile, according to an embodiment, the learning network model may be configured to learn the temporally continuous data obtained from the sensor device 200 and predict the next data corresponding to the sensor device 200. Specifically, the learning network model may be configured to predict the next data related to a specific sensor device. For example, there may be an error occurrence in the data received from the camera device. The learning network model may be configured to learn the data received previously from the camera device and predict the next data corresponding to the camera device.

According to another embodiment, the learning network model may learn temporally continuous data obtained from the sensor device 200 and data obtained from the other sensor device, and predict the next data corresponding to the sensor device. Specifically, the learning network model may learn data of the plurality of sensor devices and predict the next data. For example, there may be an error occurrence in the data received from the camera device. The learning network model may be configured to learn data received previously from the camera device, data received previously from the Radar device, and data which may be currently obtained, and predict the next data corresponding to the camera device.

Meanwhile, as described above, the learning network model may be configured to predict the next data based on previously received data without using the data with the error occurrence. However, the learning network model may, according to circumstance, correct the data with the error occurrence and predict the next data based on the corrected data and the previously received data.

Specifically, the learning network model may be configured to remove the noise included in the data with the data occurrence, and learn the data with the noise removed and the temporally continuous data obtained from the sensor device 200 and predict the next data corresponding to the sensor device 200. For example, based on the external environment being a heavy rain environment, rain drops may be displayed in the 3D image generated from the Lidar device. The 3D image with the rain drops displayed may be compared with the captured image obtained from the camera device and identified as data with an error occurrence. In this case, the learning network model may remove the rain drop display included in the 3D image, and learn the 3D image with the rain drops removed and the previously received data to predict the next 3D image data. That is, the data with the error occurrence may not be used and substituted, but the noise may be removed and used to predict the next data.

Figure 3:
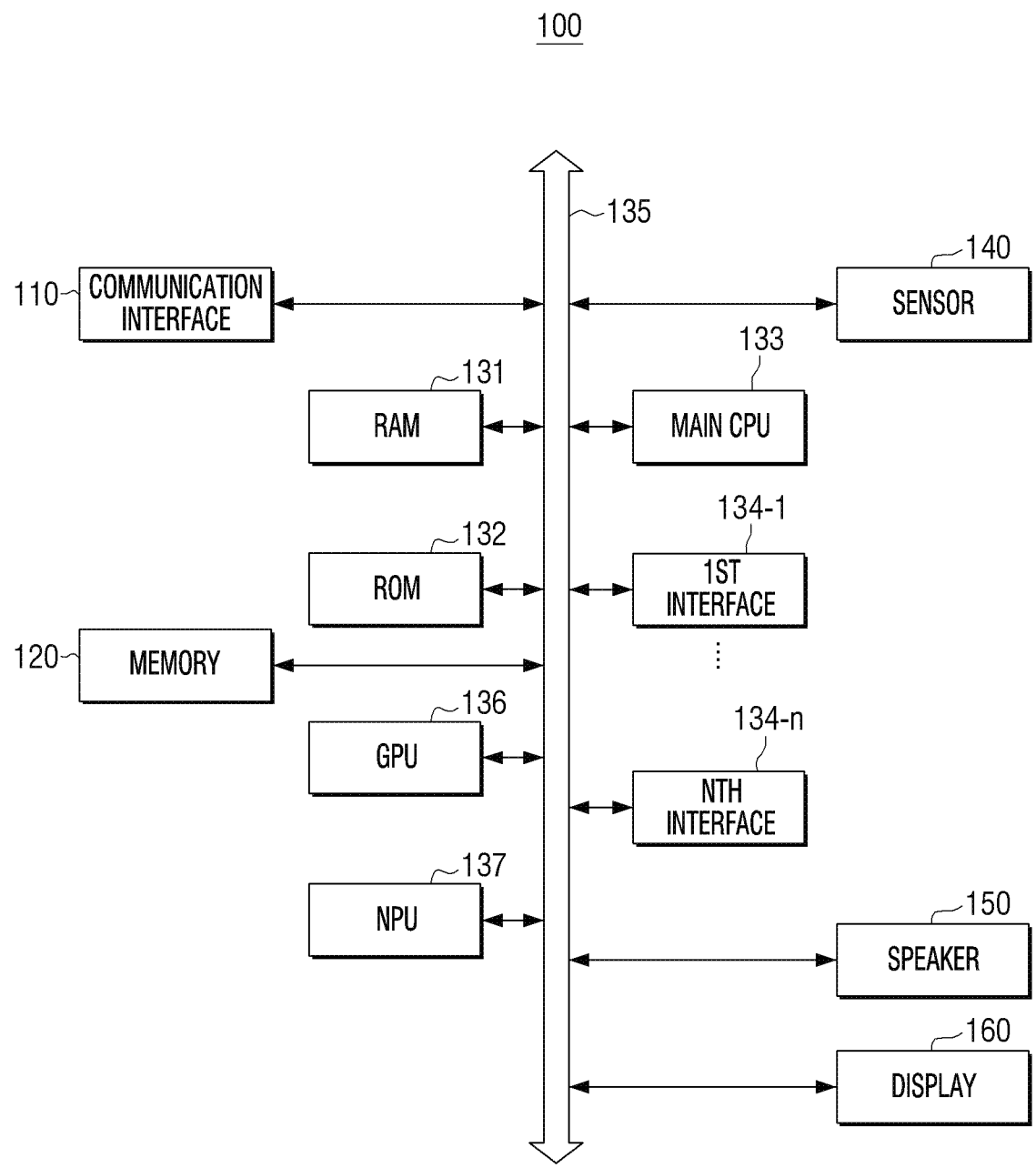
FIG. 3 is a block diagram illustrating a detailed configuration of an electronic device.

FIG. 3 is a block diagram illustrating a detailed configuration of the electronic device.

Referring to FIG. 3, the electronic device 100 may include a communication interface 110, a memory 120, a processor 130, a sensor 140, a speaker 150, and a display 160. The detailed description on parts overlapping with the configurations illustrated in FIG. 2 from among the configurations illustrated in FIG. 3 will be omitted.

The communication interface 110 may be a configuration capable of transmitting and receiving data with the sensor device 200. The communication interface 110 may include a WI-FI module (not shown), a Bluetooth module (not shown), a Local Area Network (LAN) module, a wireless communication module, or the like. Here, the respective communication modules may be implemented in at least one hardware chip form. The wireless communication module may include at least one communication chip configured to perform communication according to various wireless communication standards such as, for example, and without limitation ZigBee, Ethernet, Universal Serial Bus (USB), Mobile Industry Processor Interface Camera Serial Interface (MIPI CSI), 3rd Generation (3G), 3rd Generation Partnership Project (3GPP), Long Term Evolution (LTE), LTE Advanced (LTE-A), 4th Generation (4G), 5th Generation (5G), or the like in addition to the above described communication methods. However, this is merely an embodiment, and the communication interface 110 may be configured to use at least one communication module from among various communication modules when communicating with the sensor device 200. In addition, the communication interface 110 may be configured to transmit and receive data with the sensor device 200 through a wired communication.

The processor 130 may be configured to control the overall operation of the electronic device 100 by using various programs stored in the memory 120.

Specifically, the processor 130 may include a RAM 131, a ROM 132, a main CPU 133, a 1st to nth interface 134-1 to 134-n, and a BUS 135.

The RAM 131, the ROM 132, the main CPU 133, the 1st to nth interface 134-1 to 134-n, and the like may be interconnected through the BUS 135.

In the ROM 132, an instruction set or the like for booting the system may be stored. When a turn-on instruction is input and power is supplied, the main CPU 133 may copy an operating system (O/S) stored in the memory to the RAM 131 based on the instruction stored in the ROM 132, execute the O/S, and boot the system. When booting is completed, the main CPU 133 may copy a variety of application programs stored in the memory 120 to the RAM 131, and execute the application programs copied to the RAM 131 to perform a variety of operations. However, the above-described RAM 131 and ROM 132 may be implemented with an external memory separate from the processor 130.

The main CPU 133 may access the memory 120, and use the O/S stored in the memory 120 to perform booting. Then, various operations may be performed by using the various programs, content data, and the like stored in the memory 120. Specifically, according to an embodiment, the main CPU 123 may copy a program in the memory 120 to the RAM 131 according to an instruction stored in the ROM 132, and execute the corresponding program by accessing the RAM 131.

The 1st to nth interfaces 124-1 to 124-n may be connected to the various elements described above. One from among the interfaces may become a network interface which connect with the external device through a network.

The GPU 136 may correspond to a high-performance processing device for graphics processing, and may be an electronic circuit designed and specialized to accelerate generation of an image in a frame buffer, which is to be output to a screen, by quickly processing and changing the memory 120. In addition, the GPU 136 may refer to a visual processing unit (VPU).

The NPU 137 may correspond to an AI chipset (or, AI processor), and may be an AI accelerator. The NPU 137 may correspond to a processor chip optimized in performing deep neural network. Meanwhile, the NPU 137 may correspond to a processing device configured to execute a deep learning model in place of the GPU 136, and the NPU 137 may correspond to a processing device configured to execute the deep learning model with the GPU 136.

Meanwhile, although FIG. 3 illustrates all of the main CPU 133, the GPU 136, and the NPU 137, the processor 130 may be configured to operate by being implemented with at least one from among the main CPU 133, the GPU 136, or the NPU 137 at an actual implementation.

The sensor 140 may be a configuration for sensing the vehicle surroundings. The sensor 140 has bee described above as the sensor device 200, which is an external device separate from the electronic device 100, but in some cases, the sensor 140 may also be provided inside of the electronic device 100.

Meanwhile, the sensor 140 may include at least one from among the camera device, the Lidar device, the Radar device, or the IR device.

The camera device may capture the surrounding image of the vehicle. In an example, an object, a lane, a traffic sign, and the like located in the surroundings of the vehicle may be captured through the camera device. The camera device may be implemented as a single camera or a plurality of cameras. For example, the camera device may be disposed at a front and rear of the vehicle.

The LIght Detection And Ranging (LIDAR) device may be a sensor configured to detect the surrounding environment such a shape of an object and a distance with an object by emitting a laser and using reflected light returned by being reflected from a surrounding object. The LIDAR device may generate a 3D image of the surroundings by using reflected light.

The RAdio Detection And Ranging (RADAR) device may be configured to emit electromagnetic waves, and use reverberating waves which are reflected from surrounding objects and returned to detect a location of an object, and a speed and/or direction of an object. That is, the RADAR device may be a sensor configured to detect an object in an environment in which the vehicle is located by using a wireless signal. The electromagnetic waves used in the RADAR device may vary according to the purpose thereof. For example, when a low frequency electromagnetic wave with a long wavelength is used, a detection distance may be increased due to low attenuation, but a resolution may be decreased due to difficulty in identifying objects smaller than the wavelength. On the other hand, when a high frequency with a short wavelength is used, the resolution may be increased but attenuation may appear due to absorption or scattering by moisture, clouds, air, and the like in the air.

The IR device may be a device configured to detect an object by measuring temperature and the like using infrared rays.

Meanwhile, the sensor 140 may further include a Global Positioning System (GPS) device, an Inertial Measurement Unit (IMU), and an ultrasonic sensor in addition to the above-described devices.

The GPS device may be a configuration for detecting a geographical location of the vehicle, and the sensor 140 may be configured to also obtain the location information detected through the GPS device when obtaining the surrounding image.

The IMU may be a combination of sensors configured to detect the location and changes in orientation of the vehicle based on an inertial acceleration. For example, the sensors may include accelerometers and gyroscopes.

The ultrasonic sensor may be configured to identify an object by using ultrasonic reflection.

The speaker 150 may be a configuration providing a voice or sound. Specifically, the speaker 150 may output a warning sound notifying of an abnormal sensing state or provide a voice recommending to the user of personally driving. However, the electronic device 100 may not include the speaker 150, and transmit a control signal for outputting the warning sound to an external speaker device (not shown).

The display 160 may be configured to display various content including vehicle driving information, and the like. Here, the vehicle driving information may include a current speed of the vehicle, a speed limit of the road in which vehicle is currently driving in, traffic sign information, and the like. Specifically, the display 160 may be configured to display at least one from among the type of the traffic sign and instructed content identified by the control of the processor 130.

Specifically, the display 160 may be configured to provide visual information notifying of an abnormal sensing state.

The display 160 may be implemented to various forms such as, for example, and without limitation, liquid crystal display (LCD), organic light-emitting diode (OLED), Liquid Crystal on Silicon (LCoS), Digital Light Processing (DLP), quantum dot (QD), Micro light-emitting diode (Micro LED) display, or the like. Specifically, the display 160 may be implemented to a touch screen form comprising an interlayered structure with a touch pad. In this case, the display 160 may be configured to use the above-described user interface (not shown) in addition to the output device. Here, the touch screen may be configured to detect not only a touch input location and area, but also a touch input pressure.

However, the electronic device 100 may be configured to transmit a control signal to the external display device (not shown) without including the above-described display 160. In this case, the external display device may be implemented as a device including a navigation device or a cluster screen.

Figure 4A:
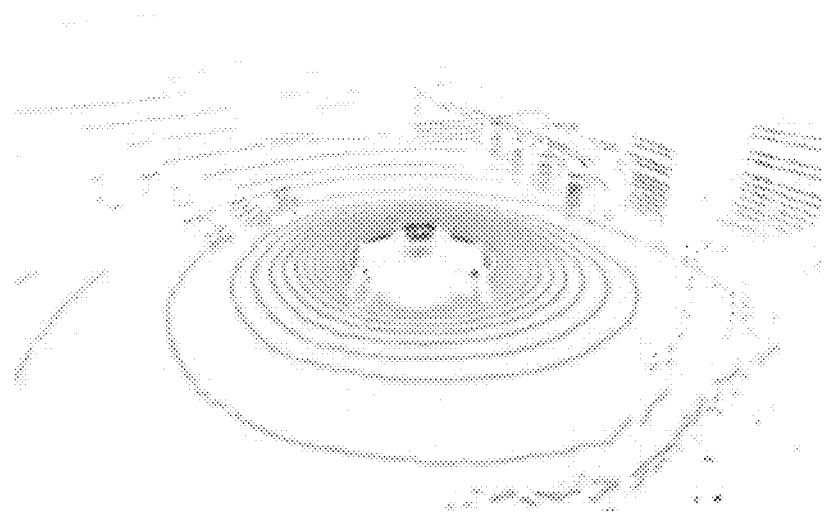
FIG. 4A is a 3D image generated by a Lidar device when in a normal state with no error occurrences.
Figure 4B:
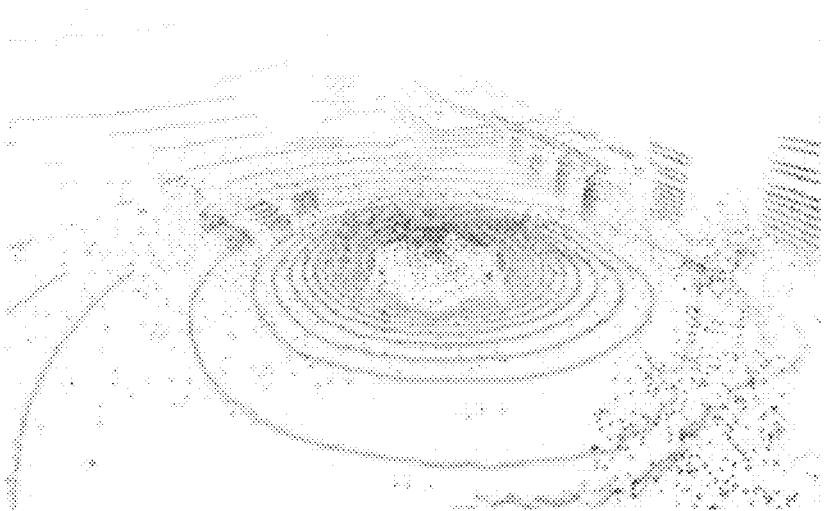
FIG. 4B is a diagram illustrating an error occurrence in a 3D image from a Lidar device.

FIG. 4A and FIG. 4B are a diagram illustrating a data error occurrence of a Lidar device according to an embodiment of the disclosure.

FIG. 4A is a 3D image generated by a Lidar device when in a normal state with no error occurrences.

The electronic device 100 may be configured to generate a live map based on the 3D image generated by the Lidar device, an image captured from the camera device at the same time as the 3D image, and the like. Accordingly, the electronic device 100 may be configured to identify the location of the object, the type of the object, the distance with the object, the lane, the traffic sign, and the like and perform the autonomous driving function of the vehicle based thereof.

On the other hand, FIG. 4B is a diagram illustrating an error occurrence in a 3D image from a Lidar device. Although FIG. 4B is a 3D image generated at the same location as with FIG. 4A, rain drops are shown due to the image being generated in a raining environment. The electronic device 100 may recognize noise such as rain drops as obstacles and perform emergency braking of the vehicle. Accordingly, in order for the electronic device 100 to not recognize this noise as obstacles, there is a need for identifying corresponding data as data with an error occurrence. Based on identifying as data with an error occurrence, the electronic device 100 may be configured to perform the autonomous driving function safely by not using the corresponding data and using data predicted by the learning network model.

In order to identify whether error occurrence of data has occurred, the electronic device 100 may compare data of one sensor device and data of another sensor device. For example, the electronic device 100 may compare an image captured from the camera device at the same time the 3D image of FIG. 4B and the 3D image of FIG. 4B is obtained and identify that noise is included in the 3D image. Accordingly, the electronic device 100 may identify of an error occurrence in the 3D image generated from the Lidar device.

FIG. 5 is a diagram illustrating a data error occurrence of a camera device according to an embodiment of the disclosure.

Figure 5A:
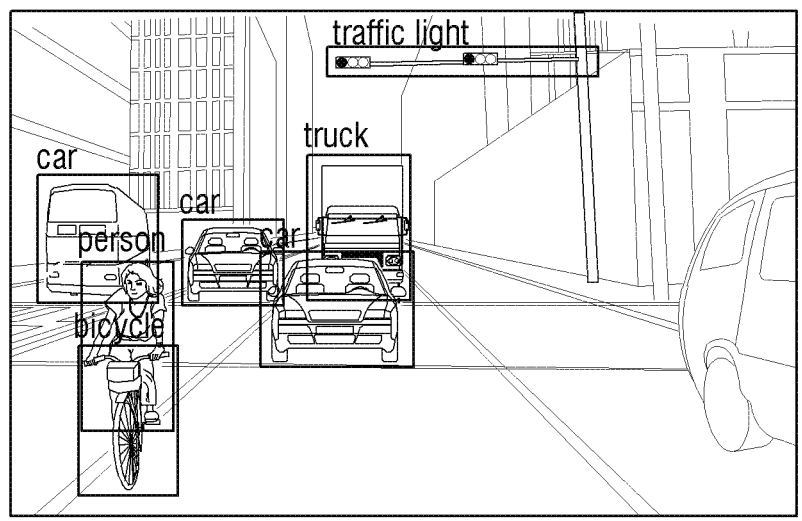
FIG. 5A is a diagram illustrating an example of a captured image from a camera device.

FIG. 5A is a diagram illustrating an example of a captured image from a camera device. As in FIG. 5, the electronic device 100 may detect an object in the image captured from the camera device, and identify the type of the object. Here, the operation of detecting an object or the like may be performed in a dedicated chip included in the camera device or performed in the electronic device 100 which received the image (raw data) captured from the camera device.

Figure 5B:
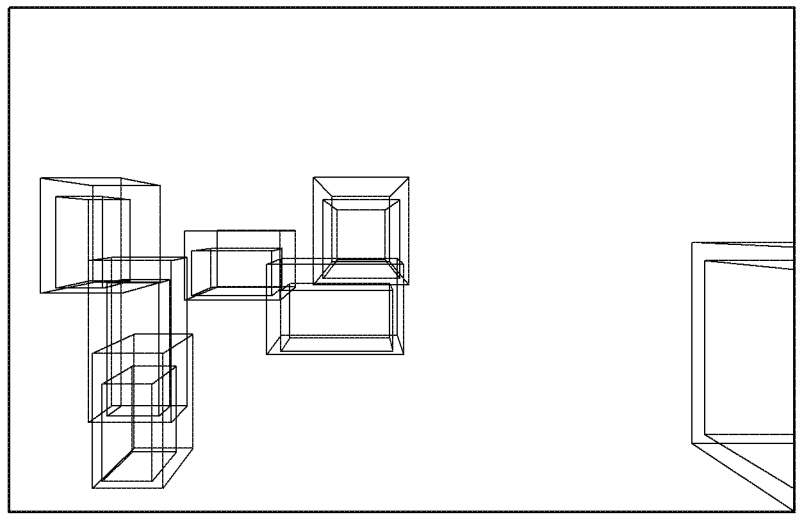
FIG. 5B is a 3D image generated by remaining devices when an error has occurred in data obtained from a camera device.

FIG. 5B is a 3D image generated by remaining devices (e.g., Lidar device, Radar device) when an error has occurred in data obtained from a camera device. When there is an error occurrence in the data obtained from the camera device, the electronic device 100 may be able to identify the location of the object, the distance with the object, and the like based on data obtained from the Lidar device and/or Radar device, but may not identify the type of the object. For example, based on an error occurring in the data obtained from the camera device, although the electronic device 100 may identify that an object of a circular shape is present at a specific area, the corresponding object being a traffic sign, and the speed limit of the traffic sign limiting maximum speed may not be identified. Alternatively, the electronic device 100 may not be able to calculate a time to collision with the object at the front and a safe braking distance.

In this case, the electronic device 100 may be configured to identify the type of the object and the like because of the data predicted by the learning network model which learned the data obtained from a camera of the related art and safely perform the vehicle autonomous driving function.

Figure 6:
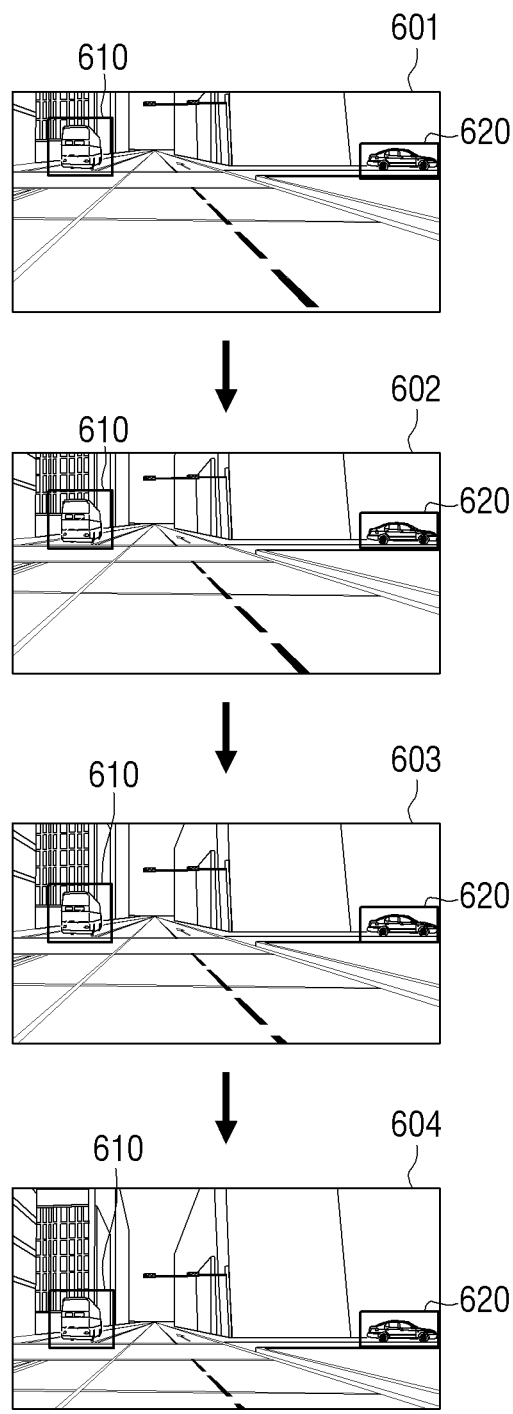
FIG. 6 is a diagram illustrating an operation of predicting a next data according to an embodiment of the disclosure.

FIG. 6 is a diagram illustrating an operation of predicting a next data according to an embodiment of the disclosure.

The learning network model may be a model configured to predict the next data by learning the temporally continuous data.

FIG. 6 is a diagram illustrating an operation of predicting the next data by learning existing data obtained from the camera device.

When an error occurrence is identified as having occurred in the data received from the sensor device 200, the learning network model may be configured to generate prediction data to substitute data with the error occurrence by learning the existing data.

Images 601 to 603 of FIG. 6 may be temporally continuous data obtained from the camera device. The electronic device 100 may store images 601 to 603. An error occurrence occurring in the data obtained from the camera device after capturing image 603 may be assumed. For example, an image of a normal state may not be obtained due to foreign matter contacting a lens of the camera device. As described above, based on identifying an error occurrence in the data, the learning network model may learn the stored images 601 to 603 and predict image 604 which corresponds to the next data. In an example, the learning network model may be configured to predict the location of vehicle 1 610 in image 604 based on the distance, relative speed, and the like with vehicle 1 610 included in images 601 to 603. In addition, the learning network model may be configured to predict the location of vehicle 2 620 as not having moved in image 604 based on learning that vehicle 2 620 included in images 601 to 603 has not moved.

Meanwhile, as described above, the learning network model may be configured to predict the next data when it is identified that an error has occurred in the data, but the learning network model may learn the existing data regardless of whether there is an error occurrence and predict the next data, and output the predicted data when an error has occurred.

Figure 7A:
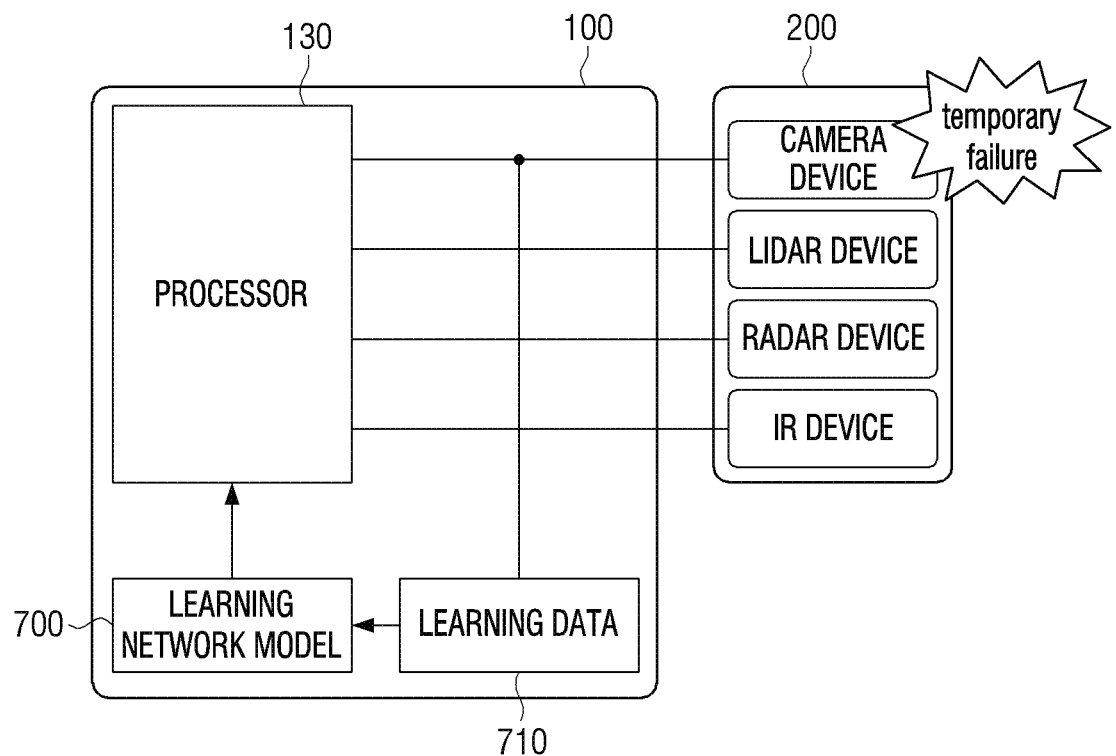
FIG. 7A is a diagram illustrating an operation of predicting a next data by learning existing data of a specific sensor device according to an embodiment of the disclosure.

FIG. 7A is a diagram illustrating an operation of predicting a next data by learning existing data of a specific sensor device according to an embodiment of the disclosure.

As in FIG. 7A, an error occurrence (temporary failure) occurring in the camera device may be assumed. In this case, the temporally continuous existing data obtained from the camera device may be learning data 710, and the learning network model 700 may learn the learning data 710 of the camera device and predict the next data corresponding to the camera device. That is, the learning network model 700 may be configured to predict the next data of a specific sensor device by using only the existing data of the specific sensor device as learning data.

Then, the learning network model 700 may be configured to output the predicted data to the processor 130, and the processor 130 may be configured to perform the autonomous driving function based on the output prediction data.

Although, FIG. 7A shows an error occurrence in the camera device, this is merely one embodiment, and the above-described operation may be performed even when there is error occurrence in other devices.

Figure 7B:
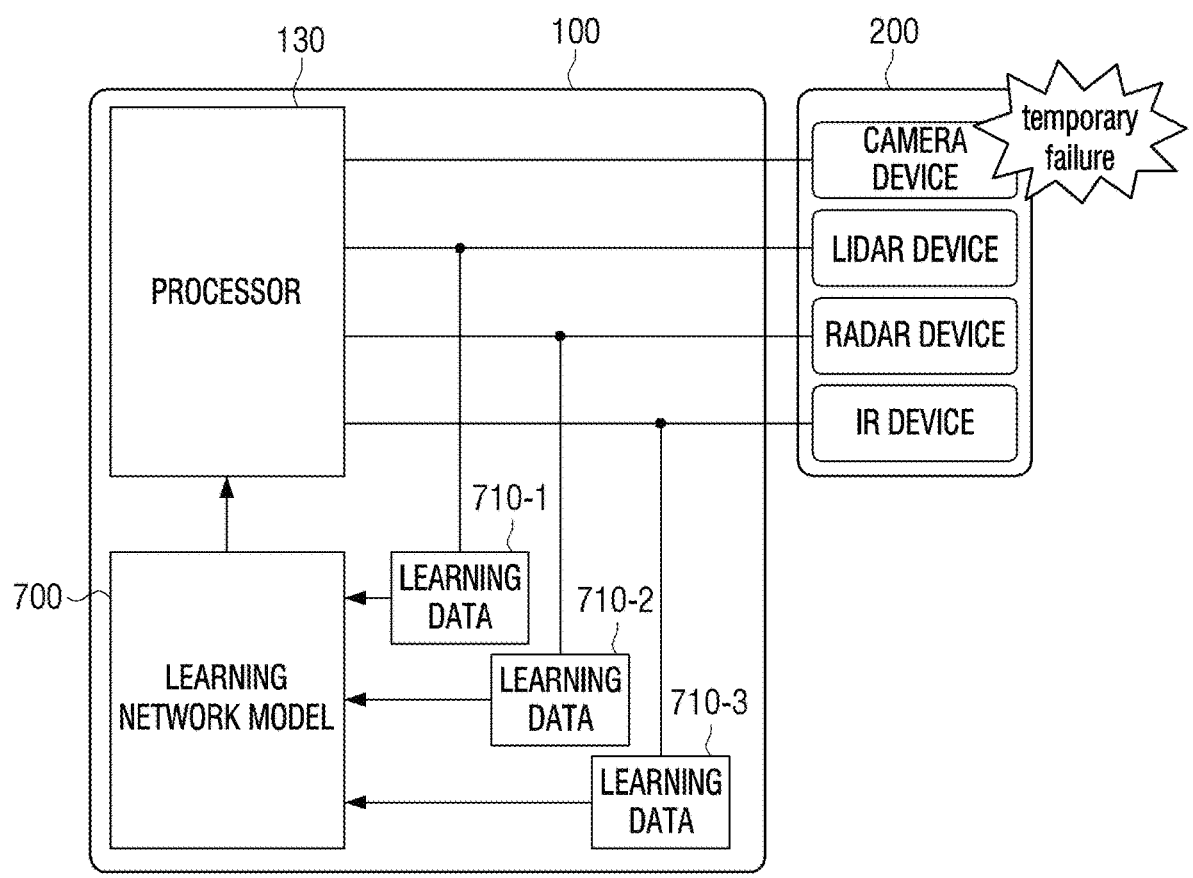
FIG. 7B is a diagram illustrating an operation of predicting a next data by learning existing data of a plurality of sensor devices according to an embodiment of the disclosure.

FIG. 7B is a diagram illustrating an operation of predicting a next data by learning existing data of a plurality of sensor devices according to an embodiment of the disclosure.

As in FIG. 7B, an error occurrence (temporary failure) occurring in the camera device may be assumed. In this case, the temporally continuous existing data 710-1 obtained from other sensor devices, for example, a Lidar device, the temporally continuous existing data 710-2 obtained from a Radar device, and the temporally continuous existing data 710-3 obtained from an IR device may be learning data, and the learning network model 700 may learn the learning data 710-1 to 710-3 of the Lidar device, the Radar device, and the IR device and predict the next data corresponding to the sensor device 200. That is, the learning network model 700 may be configured to predict the next data by learning the existing data of the plurality of sensor devices.

Then, the learning network model 700 may be configured to output the predicted data to the processor 130, and the processor 130 may be configured to perform the autonomous driving function based on the output prediction data.

In FIG. 7B, although the data obtained from the camera device has been described as not being used as learning data, the existing data prior to the error occurrence in the camera device may be used as learning data. In addition, the learning network model 700 may be configured to remove noise included in the data with the error occurrence, and use the data with the noise removed as learning data.

Figure 8:
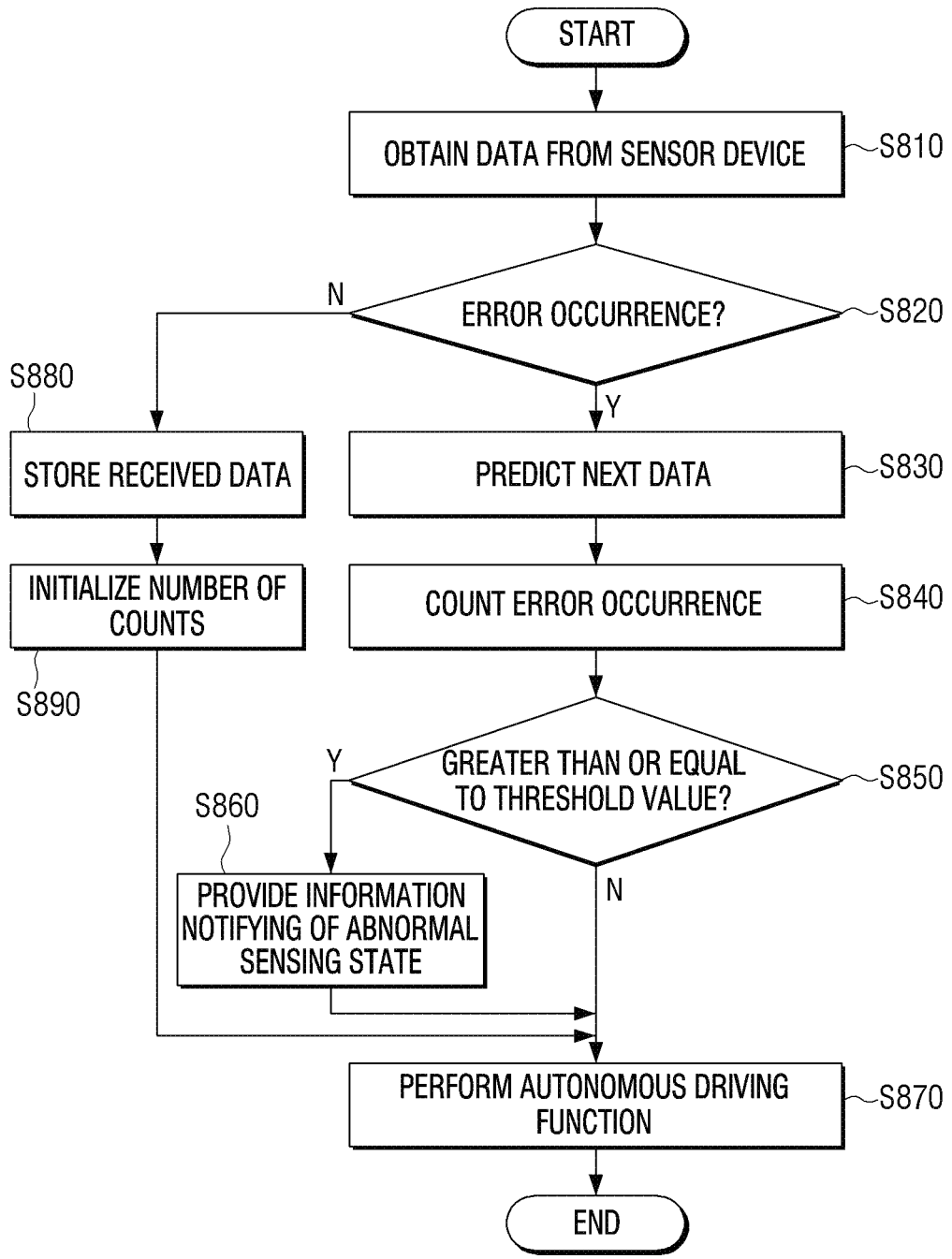
FIG. 8 is a diagram illustrating an operation of an electronic device for performing an autonomous driving function according to an embodiment of the disclosure.

FIG. 8 is a diagram illustrating an operation of the electronic device for performing the autonomous driving function according to an embodiment of the disclosure.

The electronic device 100 may be configured to obtain data from the sensor device 200 (S810). Here, the data may be raw data (e.g., image captured from the camera device) or data in which preprocessing is performed (e.g., object detection is performed).

The electronic device 100 may be configured to identify whether an error occurrence of the received data has occurred (S820).

According to an embodiment, the electronic device 100 may be configured to identify whether there is an error occurrence in the received data by comparing the data received from the sensor device 200 and the data received from the other sensor device. For example, the Lidar device may be configured to generate a 3D image by recognizing rain drops as objects in a raining situation. That is, in the 3D image generated by the Lidar device, rain drops may be displayed as dots. However, in the image captured by the camera device, the rain drops may not be captured. In this case, the electronic device 100 may compare the 3D image obtained by the Lidar device and the image captured by the camera device to identify a difference in data, and identify that there is an error occurrence in the data received from the sensor device 200.

According to another embodiment, the electronic device 100 may be configured to identify whether there is an error in the data based on data obtained from the one sensor device 200. In an example, based on the blackening phenomenon occurring in an image captured from the camera device, the electronic device 100 may determine that the pixel value of the corresponding image does not belong in the pixel value range included in the reference data and the data in which the blackening phenomenon has occurred may be identified as an error occurring.

Meanwhile, as described above, the error of the received data may include not only the case of having received the data but receiving data with the error included, but also the case of the electronic device 100 failing in receiving data.

When it is identified that there is an error occurrence in the data received from the sensor device 200 (S820-Y), the learning network model may be configured to predict the next data which is to substitute the received data (S830). Specifically, the learning network model may be configured to learn the temporally continuous existing data and predict the next data. For example, based on learning the image captured consecutively for 10 seconds from the camera device, the learning network model may be configured to predict the next image in the section following the 10 seconds. Here, the learning network model may be the Generative Adversarial Network (GAN) model.

Meanwhile, the electronic device 100 may be configured to count the number of error occurrences (S840). For example, the electronic device 100 may be configured to count the number of frames of a situation which is identified as an error having occurred. In an example, based on the frame per second being 30 FPS and there being an error occurrence for 3 seconds, the electronic device 100 may be configured to count the number of error occurrences as 90.

The electronic device 100 may be configured to identify whether the number of counts in which there is an error occurrence is greater than or equal to the threshold value (S850).

Based on the number of counts being greater than or equal to the threshold value (S850-Y), the electronic device 100 may be configured to provide information notifying of an abnormal sensing state of the sensor device 200 (S860). For example, the electronic device 100 may be configured to output a specific sound or a voice through the speaker 150. In an example, the electronic device 100 may be configured to output a warning sound through the speaker 150 or provide a voice suggesting to the user of personally driving. Alternatively, the electronic device 100 may be configured to provide information notifying of an abnormal sensing state through the display 160. For example, the electronic device 100 may be configured to provide information notifying of an abnormal sensing state through the navigation screen or the cluster screen. Alternatively, the electronic device 100 may be configured to provide notification in the form of vibrating a steering wheel or emitting a light source.

However, even if the sensing state of the sensor device 200 is identified as abnormal, the autonomous driving function may not be immediately terminated and the autonomous driving function may be performed (S870). Accordingly, the electronic device 100 may be configured to provide time for the user to perform personal driving and raise driving safety.

Meanwhile, based on the number of counts being less than the threshold value (S850-N), the number of counts may be initialized and the autonomous driving function may be performed.

In addition, when it is identified that there is no error occurrence in the data received from the sensor device 200 (S820-N), the electronic device 100 may be configured to store the received data (S880). The received data may be used as learning data which the learning network model learns to predict the next data. In addition, the electronic device 100 may be configured to initialize the number of counts (S890), and perform the autonomous driving function (S870).

Figure 9:
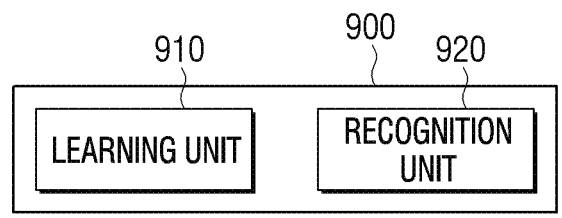
FIG. 9 is a diagram illustrating an operation of a learning unit and a recognition unit according to an embodiment of the disclosure.

FIG. 9 is a diagram illustrating an operation of the learning unit and the recognition unit according to an embodiment of the disclosure.

Referring to FIG. 9, the processor may include at least one of the learning unit 910 and the recognition unit 920. The processor of FIG. 9 may correspond to the processor 130 of the electronic device 100 or a processor of a data learning server (not shown).

The learning unit 910 may be configured to generate or train a recognition model having a standard for determining a predetermined situation. The learning unit 910 may be configured to generate a recognition model having a determination standard by using the collected learning data.

In an example, the learning unit 910 may be configured to use an image included with an object as learning data to generate, learn or update the object recognition model which has a standard for determining what the object included in the image is.

In another example, the learning unit 910 may be configured to use the surrounding information included in the screen in which the object is included as learning data to generate, learn or update the surrounding information recognition model having a standard for determining various additional information in the surroundings of the object included in the image.

The recognition unit 920 may be configured to use the predetermined data as input data of a trained recognition model, and estimate a recognition object included in the predetermined data.

In an example, the recognition unit 920 may be configured to use an object area (or, image) included with the object as input data of the trained recognition model and obtain (or, estimate, infer) object information on the object included in the object area.

In another example, the recognition unit 920 may be configured to apply at least one from among the object information and the context information to the trained recognition model and estimate (or, determine, infer) a search category to provide search results. At this time, the search result may be obtained in plurality according to a order of priority.

At least a portion of the learning unit and at least a portion of the recognition unit 920 may be implemented with a software module or manufactured as at least one hardware chip form and mounted in the electronic device. For example, at least one from among the learning unit 910 and the recognition unit 920 may be manufactured in a hardware chip form dedicated for artificial intelligence (AI), or manufactured as a part of a generic-purpose processor (e.g., CPU or application processor) or a graphics dedicated processor (e.g., GPU) of the related art and mounted to the various electronic devices described above or an object recognition device. At this time, the hardware chip dedicated for artificial intelligence may be a dedicated processor specializing in likelihood processing, and because it has higher parallel execution performance than the generic-purpose processor of the related art, processing operations in the field of artificial intelligence such as machine learning may be quickly processed. Based on the learning unit 910 and the recognition unit 920 being implemented with a software module (or, a program module including instructions), the software module may be stored in a non-transitory readable media which is readable by a computer. In this case, the software module may be provided by the operating system (O/S), or may be provided by a predetermined application. Alternatively, a portion of the software module may be provided by the operating system (O/S), and the remaining portion may be provided by the predetermined application.

Figure 10:
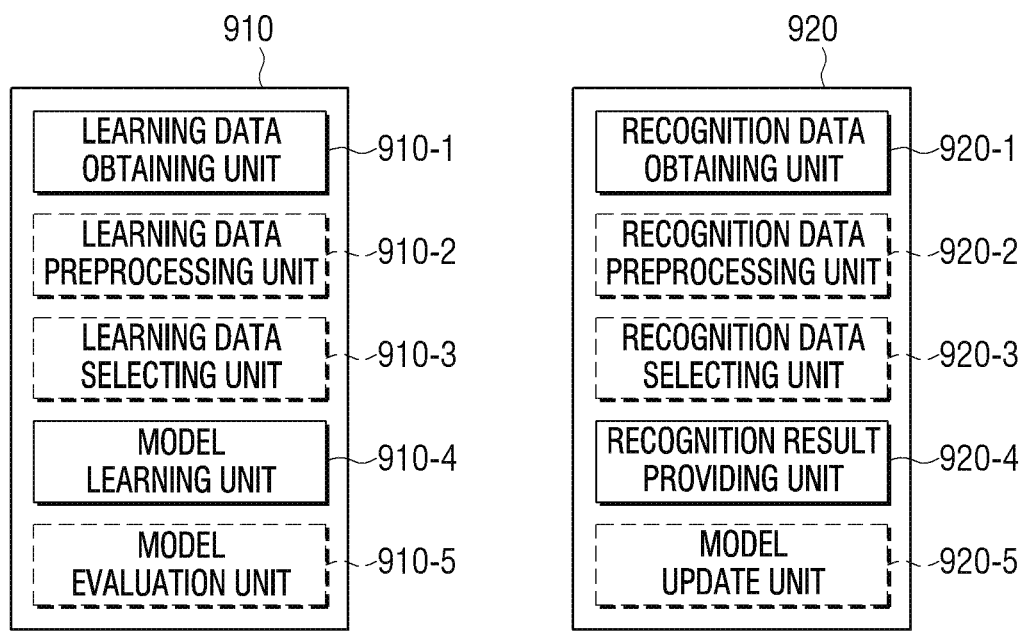
FIG. 10 is a block diagram of a learning unit and a recognition unit according to an embodiment of the disclosure.

FIG. 10 is a block diagram of the learning unit and the recognition unit according to an embodiment of the disclosure.

The learning unit 910 according to some embodiments may include a learning data obtaining unit 910-1 and a model learning unit 910-4. In addition, the learning unit 910 may selectively further include at least one from among a learning data preprocessing unit 910-2, a learning data selecting unit 910-3, and a model evaluation unit 910-5.

The learning data obtaining unit 910-1 may be configured to obtain learning data required in the recognition model for inferring the recognition object. According to an embodiment, the learning data obtaining unit 910-1 may be configured to obtain at least one from among a whole image including the object, an image corresponding to the object area, object information and context information as learning data. The learning data may be data that the learning unit 910 or the manufacturer of the learning unit 910 collected or tested.

The model learning unit 910-4 may be configured to use the learning data and train so that the recognition model has a determination standard on how to determine a predetermined recognition object. For example, the model learning unit 910-4 may be configured to train the recognition model through supervised learning which uses at least a portion from among the learning data as a determination standard. Alternatively, the model learning unit 910-4 may be configured to train the recognition model through, for example, unsupervised learning which discovers the determination standard for determining the situation by using the learning data without particular supervision to self-learn. In addition, the model learning unit 910-4 may be configured to train the recognition model through, for example, reinforcement learning which uses feedback on whether the result of determining the situation according to learning is correct.

In addition, the model learning unit 910-4 may be configured to learn a selection standard on which learning data is to be used for estimating the recognition object by using the input data.

The model learning unit 910-4 may be configured to, based on a pre-constructed recognition model being present in plurality, determine the input learning data and the recognition model with a high relevance with a basic learning data as the recognition model to be learned. In this case, the basic learning data may be pre-classified by the type of data, and the recognition model may be pre-constructed by the type of data. For example, the basic learning data may be pre-classified according to various standards such as the area where the learning data was generated, the time at which the learning data was generated, the size of the learning data, the genre of the learning data, the generator or the learning data, the type of object within the learning data, and the like.

When the recognition model is trained, the model learning unit 910-4 may be configured to store the trained recognition model. In this case, the model learning unit 910-4 may be configured to store the trained recognition model in the memory of the electronic device. Alternatively, the model learning unit 910-4 may be configured to store the trained recognition model in the memory of the server which connects to the electronic device through a wired or wireless network.

The learning unit 910 may improve the analysis result of the recognition model, or further include a preprocessing unit 910-2 and a learning data selecting unit 910-3 to save on resources or time required in generating the recognition model.

The learning data preprocessing unit 910-2 may be configured to preprocess the obtained data so that the obtained data may be used for learning to determine a situation. The learning data preprocessing unit 910-2 may be configured to process the obtained data in a pre-set format so that the model learning unit 910-4 may use the obtained data for learning to determine a situation.

The learning data selecting unit 910-3 may be configured to select the data obtained from the learning data obtaining unit 910-1 or the data required in learning from among the preprocessed data in the learning data preprocessing unit 910-2. The selected learning data may be provided to the model learning unit 910-4. The learning data selecting unit 910-3 may be obtained according to a pre-set selection standard or select the learning data required in learning from among the preprocessed data. In addition, the learning data selecting unit 910-3 may be configured to select the learning data according to a pre-set selection standard by learning of the model learning unit 910-4.

The learning unit 910 may further include a model evaluation unit 910-5 to improve the analysis result of the data recognition model.

The model evaluation unit 910-5 may be configured to input the assessment data to the recognition model, and if the analysis result output from the assessment data fails to satisfy the predetermined standard, may have the model learning unit 910-4 to re-learn. In this case, the assessment data may be a pre-defined data for assessing the recognition model.

For example, the model evaluation unit 910-5 may be configured to assess as not satisfying the predetermined standard if the number or ratio of assessment data with inaccurate analysis results exceeds a pre-set threshold value from among the analysis results of the trained recognition model on the assessment data.

Meanwhile, based on the trained recognition model being present in plurality, the model evaluation unit 910-5 may be configured to assess whether a predetermined standard is satisfied with respect to the respective trained recognition models, and determine the model satisfying the predetermined standard as the final recognition model. In this case, based on the model satisfying the predetermined standard being in plurality, the model evaluation unit 910-5 may be configured to determine any one model or models of a predetermined number which is pre-set in a descending order of the assessment score as the final recognition model.

The recognition unit 920 according to some embodiments may include an obtaining unit 920-1 and a recognition result providing unit 920-4.

In addition, the recognition unit 920 may selectively further include at least one from among a recognition data preprocessing unit 920-2, a recognition data selecting unit 920-3, and a model update unit 920-5.

The recognition data obtaining unit 920-1 may be configured to obtain data required in determining the situation. The recognition result providing unit 920-4 may be configured to apply the data obtained from the recognition data obtaining unit 920-1 to the trained recognition model as an input value and determine the situation. The recognition result providing unit 920-4 may be configured to provide an analysis result according to a purpose of data analysis. The recognition result providing unit 920-4 may be configured to apply data selected by a recognition data preprocessing unit 920-2 to be described below or the recognition data selecting unit 920-3 to the recognition model as an input value and obtain the analysis result. The analysis result may be determined by the recognition model.

In an embodiment, the recognition result providing unit 920-4 may be configured to apply the object area in which the object obtained from the recognition data obtaining unit 920-1 is included to the trained recognition model and obtain (or, estimate) object information corresponding to the object area.

In another example, the model learning unit 910-4 may be configured to apply at least one from among the object area, object information and the context information obtained from the recognition data obtaining unit 920-1 to the trained recognition model and obtain (or, estimate) a search category for providing the search results.

The recognition unit 920 may be configured to improve the analysis result of the recognition model or further include a recognition data preprocessing unit 920-2 and a recognition data selecting unit 920-3 to save on resources or time required in providing the analysis result.

The recognition data preprocessing unit 920-2 may be configured to preprocess the obtained data so that the obtained data may be used for determining the situation. The recognition data preprocessing unit 920-2 may be configured to process the obtained data to a pre-defined format so that the recognition result providing unit 920-4 is able to use the obtained data for determining the situation.

The recognition data selecting unit 920-3 may be configured to select data required in determining the situation from among the data obtained in the recognition data obtaining unit 920-1 or the data preprocessed in the recognition data preprocessing unit 920-2. The selected data may be provided to the recognition result providing unit 920-4. The recognition data selecting unit 920-3 may be configured to select a portion or all from among the obtained or preprocessed data according to the pre-set selection standard for determining the situation. In addition, the recognition data selecting unit 920-3 may be configured to select data according to the selection standard pre-set by the learning of model learning unit 910-4.

The model update unit 920-5 may be configured to control so as to update the recognition model based on an assessment on the analysis result provided by the recognition result providing unit 920-4. For example, the model update unit 920-5 may be configured to, by providing the analysis result provided by the recognition result providing unit 920-4 to the model learning unit 910-4, request the model learning unit 910-4 to additionally learn or update the recognition model.

Figure 11:
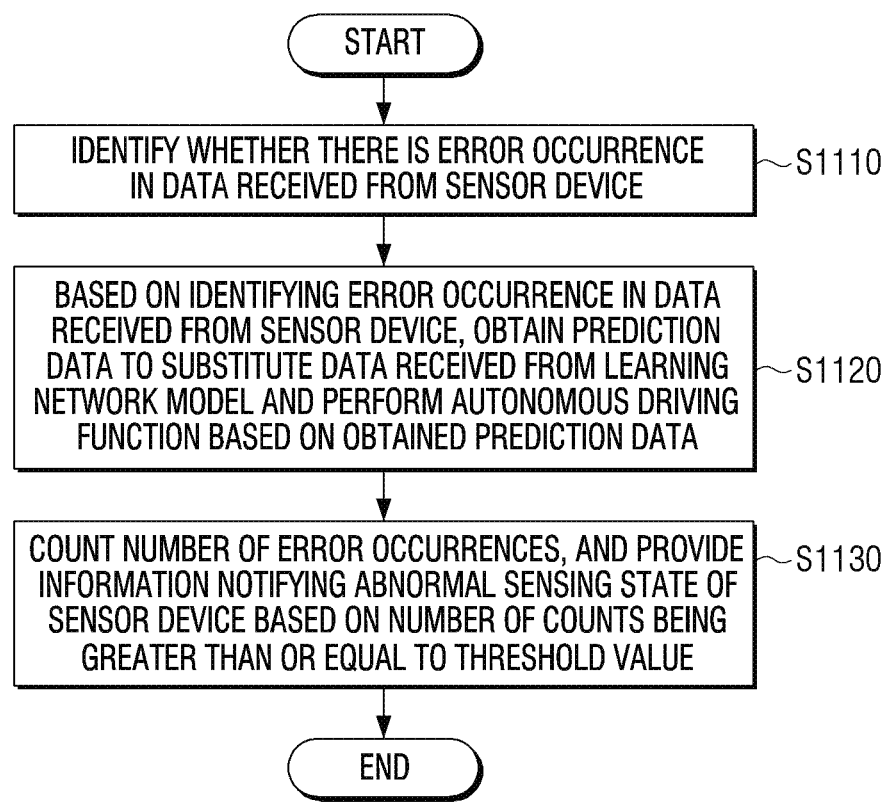
FIG. 11 is a flowchart illustrating a control method of an electronic device according to an embodiment of the disclosure.

FIG. 11 is a flowchart illustrating a control method of the electronic device according to an embodiment of the disclosure.

The electronic device 100 may be configured to identify whether there is an error occurrence in the data received from the sensor device 200 (S1110). Here, the sensor device 200 may include at least one from among the camera device, the Lidar device, the Radar device, or the IR device.

According to an embodiment, the electronic device 100 may be configured to compare data received from the sensor device 200 and data received from the other sensor device and identify whether there is an error occurrence in the received data.

According to another embodiment, the electronic device 100 may compare the data received from the sensor device 200 and the stored reference data corresponding to the sensor device 200, and identify that there is an error occurrence in the received data based on there being a difference of a threshold value or more.

Based on identifying that there is an error occurrence in the data received from the sensor device 200, the electronic device 100 may be configured to obtain prediction data to substitute the data received from the learning network model, and perform the autonomous driving function based on the obtained prediction data (S1120). Here, the learning network model may be the Generative Adversarial Network (GAN) model.

According to an embodiment, the learning network model may be configured to learn the temporally continuous data obtained from the sensor device 200 and predict the next data corresponding to the sensor device 200.

According to another embodiment, the learning network model may be configured to learn the temporally continuous data obtained from the sensor device 200 and data obtained from the other sensor device, and predict the next data corresponding to the sensor device 200.

Meanwhile, the learning network model may be configured to remove the noise included in the data in which the error occurred, and learn the data with the noise removed and the temporally continuous data obtained from the sensor device 200 and predict the next data corresponding to the sensor device 200.

Meanwhile, the electronic device 100 may be configured to perform the autonomous driving function based on the data received from the sensor device 200 and the data received from the at least one other sensor device, and when it is identified that there is an error occurrence in the data received from the sensor device 200, the data received from the sensor device 200 may be added with a relatively low weight than the data received from the other sensor device and the autonomous driving function may be performed.

The electronic device 100 may be configured to count the number of error occurrences, and based on the number of counts being greater than or equal to the threshold value, provide information notifying an abnormal sensing state of the sensor device 200 if the number of counts is greater than or equal to the threshold value (S1130).

The electronic device 100 may be configured to count the number of error occurrences within the threshold time, and initialize the number of counts based on the number of counts within the threshold time being less than the threshold value.

Because the detailed operations of the respective steps have been described above, the detailed descriptions thereof will be omitted.

Meanwhile the methods according to one or more embodiments of the disclosure described above may be implemented in application form installable to electronic devices of the related art.

In addition, the methods according to the one or more embodiments of the disclosure may be implemented by only a software upgrade or a hardware upgrade with respect to the electronic devices of the related art.

In addition, the one or more embodiments of the disclosure described above may be performed through an embedded server provided in the electronic device, or through at least one external server from among the electronic devices.

Meanwhile, according to an embodiment of the disclosure, the one or more embodiments described above may be implemented with a software including instructions stored in a machine-readable storage media (e.g., computer). The machine may call an instruction stored in the storage medium, and as a device capable of operating according to the called instruction, may include the electronic device according to the above-mentioned embodiments. Based on the instruction being executed by the processor, the processor may directly or under the control of the processor perform a function corresponding to the instruction using different elements. The instructions may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored in the storage medium and data temporarily being stored.

In addition, according to an embodiment of the disclosure, a method according to the one or more embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be at least stored temporarily in a storage medium such as a server of a manufacturer, a server of an application store, or a memory of a relay server, or temporarily generated.

In addition, according to an embodiment of the disclosure, the one or more embodiments described above may be implemented in a recordable medium which is readable by a computer or a device similar to the computer using software, hardware, or the combination of software and hardware. In some cases, the embodiments described herein may be implemented by the processor itself. According to a software implementation, embodiments such as the procedures and functions described herein may be implemented with separate software modules. The respective software modules may perform one or more of the functions and operations described herein.

Meanwhile, the computer instructions for performing processing operations of the machine according to the one or more embodiments described above may be stored in a non-transitory computer-readable medium. The computer instructions stored in this non-transitory computer-readable medium may cause a specific device to perform the processing operation in the machine according to the one or more embodiments described above when executed by the processor of the specific device.

The non-transitory computer readable medium may refer to a medium that stores data semi-permanently rather than storing data for a very short time, such as a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a USB, a memory card, a ROM, and the like.

In addition, respective elements (e.g., a module or a program) according to the one or more embodiments described above may be comprised of a single entity or a plurality of entities, and some sub-elements of the above-mentioned sub-elements may be omitted or other sub-elements may be further included in the one or more embodiments. Alternatively or additionally, some elements (e.g., modules or programs) may be integrated into one entity to perform the same or similar functions performed by the respective elements prior to integration. Operations performed by a module, program, or other element, in accordance with the one or more embodiments, may be performed sequentially, in parallel, repetitively, or in a heuristically manner, or at least some operations may be performed in a different order, omitted, or may add a different operation.

While the disclosure has been shown and described with reference to the exemplary embodiments thereof, the disclosure is not limited to the embodiments specifically described and various modifications may be made therein by those skilled in the art to which this disclosure pertains without departing from the spirit and scope of the disclosure, and such modifications shall not be understood as separate from the technical concept or outlook of the present disclosure.

What is claimed is:

1. A control method of an electronic device in which a learning network model configured to learn temporally continuous data and predict next data is stored, the method comprising:
    identifying whether there is an error occurrence in data received from an external sensor device;
    based on identifying the error occurrence in the data received from the external sensor device, obtaining prediction data to substitute data received from the learning network model and performing an autonomous driving function based on the obtained prediction data;
    counting a number of error occurrences; and
    providing information notifying of an abnormal sensing state of the external sensor device based on a number of counts being greater than or equal to a threshold value.

2. The method of claim 1, wherein the identifying whether there is an error occurrence comprises identifying whether there is an error occurrence in the data received by the external sensor device by comparing data received from the external sensor device and data received from another sensor device.

3. The method of claim 1, wherein the performing the autonomous driving function comprises:
    performing the autonomous driving function based on data received from the external sensor device and data received from at least one other sensor device, and
    based on identifying an error occurrence in the data received from the external sensor device, adding a relatively low weight to the data received from the external sensor device than the data received from the at least one other sensor device and performing the autonomous driving function.

4. The method of claim 1, wherein the identifying whether there is an error occurrence comprises:
    comparing the data received from the external sensor device and the stored reference data corresponding to the external sensor device, and
    based on there being a difference greater than or equal to a threshold value, identifying there is an error occurrence in the data received by the external sensor device.

5. The method of claim 1, wherein the external sensor device comprises at least one from among a camera device, a lidar device, a radar device, or an infrared (IR) device.

6. An electronic device, comprising:
    a communication interface comprising circuitry;
    a memory storing a learning network model configured to learn temporally continuous data and predict next data; and
    a processor configured to:
        obtain, based on identifying an error occurrence in data received from an external sensor device through the communication interface, prediction data to substitute data received from the learning network model,
        perform an autonomous driving function based on the obtained prediction data,
        count a number of error occurrences, and
        provide information notifying of an abnormal sensing state of the external sensor device based on a number of counts being greater than or equal to a threshold value.

7. The electronic device of claim 6, wherein the processor is configured to compare data received from the external sensor device and data received from another sensor device and identify whether there is an error occurrence in the data received from the external sensor device.

8. The electronic device of claim 6, wherein the processor is configured to:
    perform the autonomous driving function based on data received from the external sensor device and data received from at least one other sensor device, and
    based on identifying an error occurrence in the data received from the external sensor device, add a relatively low weight to the data received from the external sensor device than the data received from the at least one other sensor device and perform the autonomous driving function.

9. The electronic device of claim 6, wherein the memory is configured to store reference data corresponding to the respective sensor devices, and
    wherein the processor is configured to identify, based on there being a difference greater than or equal to a threshold value by comparing the data received from the external sensor device and the reference data corresponding to the external sensor device, that an error has occurred in the data received from the external sensor device.

10. The electronic device of claim 6, wherein the external sensor device includes at least one from among a camera device, a lidar device, a radar device, or an infrared (IR) device.

11. The electronic device of claim 6, wherein the learning network model is a generative adversarial network (GAN) model.

12. The electronic device of claim 6, wherein the processor is configured to count the number of error occurrences within a threshold time, and initialize the number of counts based on the number of counts within the threshold time being less than a threshold value.

13. The electronic device of claim 6, wherein the learning network model is configured to learn temporally continuous data obtained from the external sensor device and predict next data corresponding to the external sensor device.

14. The electronic device of claim 6, wherein the learning network model is configured to learn temporally continuous data obtained from the external sensor device and data obtained from another sensor device, and predict next data corresponding to the external sensor device.

15. The electronic device of claim 6, wherein the learning network model is configured to remove noise comprised in data with an error occurrence, learn data with the noise removed and temporally continuous data obtained from the external sensor device, and predict next data corresponding to the external sensor device.

* * * * *